(No Model.) 2 Sheets—Sheet 1.
D. E. KEMPSTER.
ROWING VEHICLE.
No. 305,198. Patented Sept. 16, 1884.
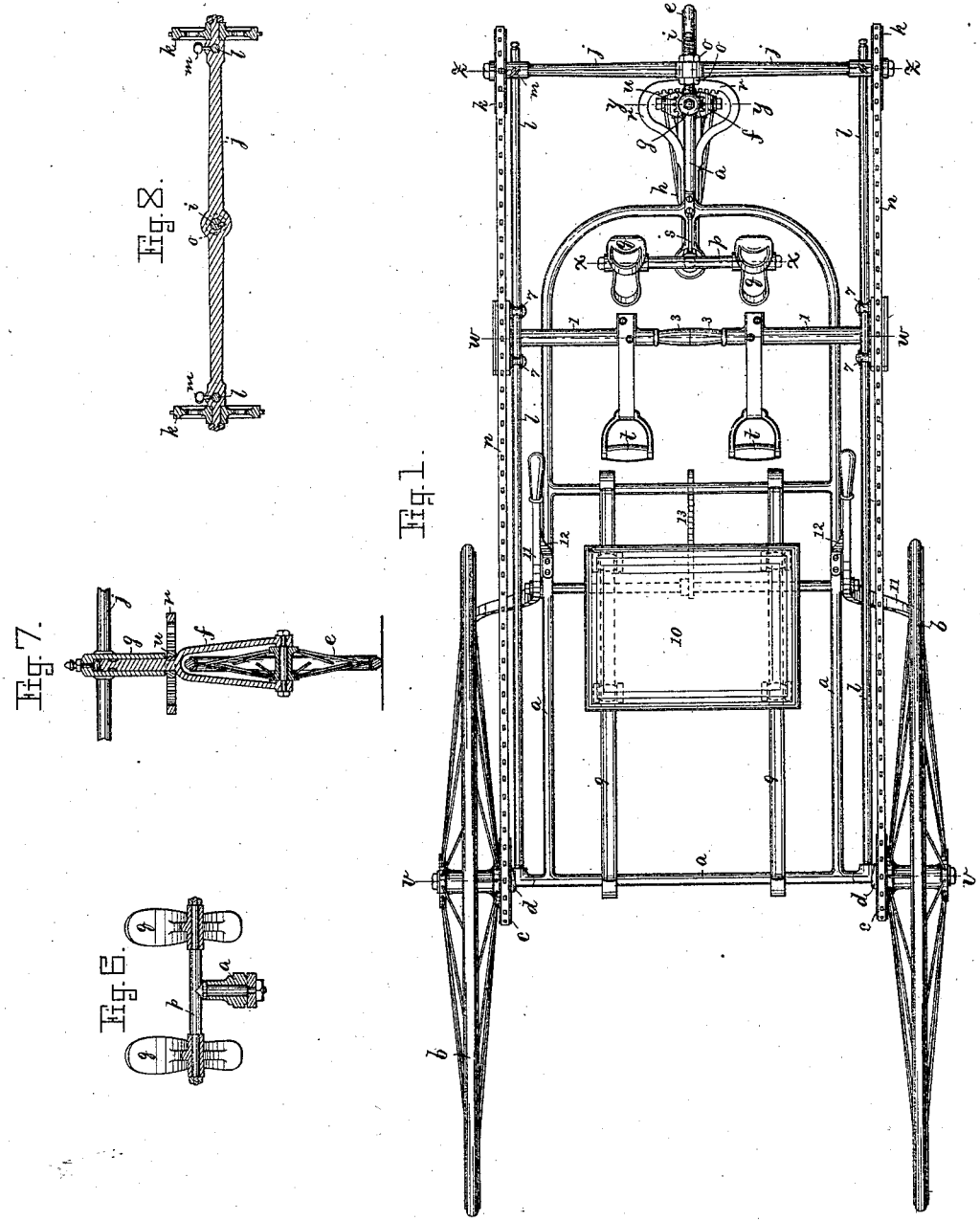
Witnesses
Henry Chadbourn.
John H. Foster.
Inventor
Daniel E. Kempster.

(No Model.) 2 Sheets—Sheet 2.
D. E. KEMPSTER.
ROWING VEHICLE.
No. 305,198. Patented Sept. 16, 1884.
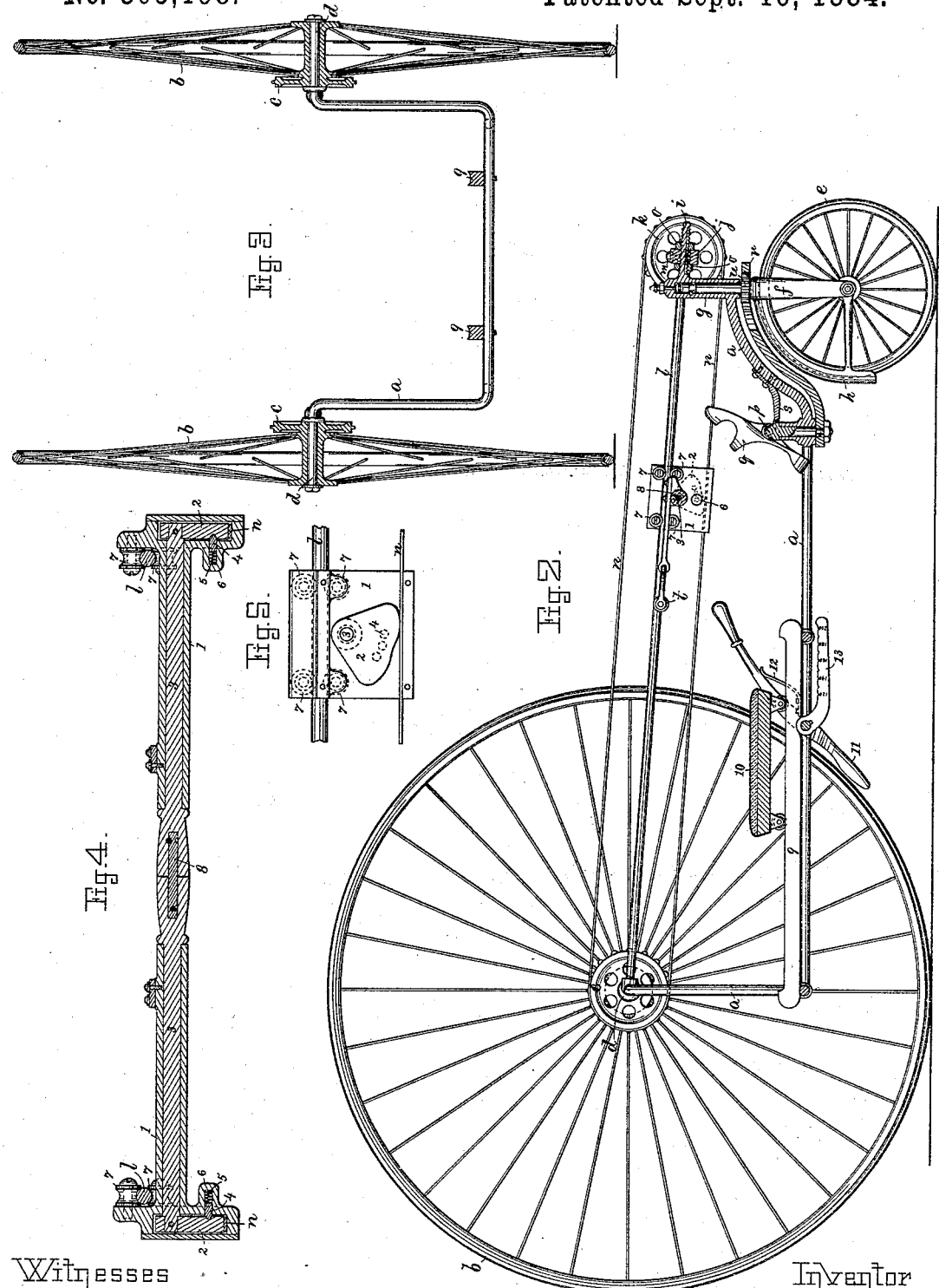
Witnesses
Henry Chadbourn.
John H. Foster.
Inventor
Daniel E. Kempster

UNITED STATES PATENT OFFICE.

DANIEL E. KEMPSTER, OF BOSTON, MASSACHUSETTS.

ROWING-VEHICLE.

SPECIFICATION forming part of Letters Patent No. 305,198, dated September 16, 1884.

Application filed November 12, 1883. (No model.)

*To all whom it may concern:*

Be it known that I, DANIEL E. KEMPSTER, a citizen of the United States, residing at Boston, in the county of Suffolk and State of Massachusetts, have invented certain new and useful Improvements in a Rotary Rowing Machine or Vehicle; and I do hereby declare that the same are fully described in the following specification, and illustrated in the accompanying drawings.

My invention has for its object to provide a land or water conveyance or vehicle for athletic exercising and racing purposes, and one which shall contain all the essential features of shell-boat rowing, so that all the pleasure and benefits of this acknowledged best of all exercises for developing the whole human system may be realized either on land or water.

My invention relates to hand-propelled vehicles; and it consists of the devices, combinations, and construction, as hereinafter described, and especially pointed out in the claims.

In the accompanying drawings, in which similar letters of reference indicate like parts, Figure 1 is a plan view of my rotary rowing machine or vehicle arranged for land purposes. Fig. 2 is a central longitudinal section of the same. Fig. 3 is a cross-section on the line $v\, v$. (Shown in Fig. 1.) Fig. 4 is an enlarged cross-section on the line $w\, w$. (Also shown in Fig. 1.) Fig. 5 is an end view of the reciprocating pulling-bar having its end plate removed, showing one of the friction clutch-pawls 2. Fig. 6 is a cross-section on the line $x\, x$. (Shown in Fig. 1.) Fig. 7 is a cross-section on the line $y\, y$, also shown in Fig. 1. Fig. 8 is a cross-section on the line $z\, z$. (Also shown in Fig. 1.)

Reference being had to the accompanying drawings, $a$ indicates the frame or body of the rotary rowing machine or vehicle.

$b\, b$ are the propelling-wheels, the hubs of which have on their inner side and attached thereto chain or sprocket wheels $c\, c$. The propelling-wheels with their chain-wheels are loosely mounted on axles $d\, d$, extending out from the frame $a$, and are prevented from lateral movement by collars and nuts and washers on the axles, as is usual.

$e$ is the steering-wheel, mounted in a forked spindle, $f$, terminating in a cylindrical center steering-head, $g$, and is provided with a mud-shield, $h$. The steering-head $g$ has a stud or threaded portion, $i$, extending out in front, on which a cross-bar, $j$, is supported. Said bar has bearings turned or formed on its ends, on which are chain-wheels $k\, k$, held loosely in place by shoulders and nuts and washers in the usual manner.

Rods $l\, l$ are screwed into the frame $a$ just inside the collars on the main axles $d\, d$. The other ends of these rods extend through holes in the cross-bar $j$, and are held by set-screws $m\, m$, as shown in Figs. 1 and 8. $n\, n$ are endless chains or bands of steel or other suitable material, which pass around the chain-wheels $c\, c$ and $k\, k$. To enable the tension of these chains to be regulated, the cross-bar $j$ merely slips over the threaded stud $i$, and is held in any position thereon by the check-nuts $o\, o$. This stud $i$ has a key way or slot its whole length on the under side. A corresponding keyway is also in the cross-bar $j$, and a sliding key therein is held in place by the check-nuts $o\, o$. This key holds the cross-bar $j$ square and level, and yet admits of a lateral or "fore-and-aft" adjustment of the same by the check-nuts $o\, o$, as shown in Figs. 1, 2, and 8.

$p$ is the steering-bar having swivel foot-rests $q\, q$. Said bar swivels on a stud extending down through a boss on the frame $a$. On the end of this stud, securely fastened, is a sector or toothed segment, $r$. Said sector is shaped to conform to the shape of the adjacent part of the frame $a$ and mud-shield $h$, as shown in Fig. 2. This sector is also made in the form of yoke or having an opening through it, so as to admit of the teeth of the same being formed internal on that part of said yoke farthest from its pivoted center, as shown plainly in Fig. 1.

As shown in Figs. 1, 2, and 7, the forked spindle $f$ has an adjustable steel step, and is also prevented from dropping out when the machine is raised from the ground by a pin through the center steering-head, $g$, lying in a groove in the spindle $f$; also, the spindle $f$ has a small gear, $u$, keyed or otherwise fastened to it just between its fork and the cylindrical head $g$. This gear meshes into the internal teeth on the sector $r$. The inner sides of the sector, by coming in contact with the gear, form a stop to limit its motion, which may be sufficient to turn the steering-wheel $e$ far enough around to turn the vehicle in a circle as small as desired. The size of the spindle-gear and the radius of the sector are such that a very slight movement of the steering-bar $p$ is sufficient to steer the vehicle in any direction. A spring, $s$, is fastened to the frame $a$, and its end enters a groove in the head or center of the steering-bar $p$. This insures the steering-wheel $e$ always assuming a central position on removing the feet from the steering-bar.

1, 2, 3, 4, 5, 6, 7, and 8 indicate the reciprocating pulling-bar, made up of several parts, and having the pulling-handles $t\ t$. Said handles swivel or turn a little, so as to "feather" the oars when coming back in the same manner as ordinary rowing. The pulling-handles $t\ t$ are attached to the reciprocating bar by flexible connections, which may be made adjustable as to length. As shown in Fig. 4, the reciprocating bar is composed of several parts, first of which are two hollow shafts, 1 1, having on their outer ends heads or boxes, through which the endless chains or bands $n\ n$ pass, and which also contain the friction clutch-pawls 2 2. Said pawls are fastened on the ends of the central reversing-shaft, 3 3. The pawls have three countersinks or spots, in which acts the conical point of pin 4, forced up by a spiral spring, 5, contained in a hole in a boss, 6, on the back of the box or head of the hollow shafts 1 1, as shown in Figs. 2, 4, and 5, thereby holding said pawls in frictional contact with the chains or bands $n\ n$, either for pulling ahead or backing, or the pawls may be thrown completely out of engagement with said chains or bands by causing the conical-pointed pin 4 to enter the central countersink or notch in the aforesaid pawls 2 2. The heads or boxes 1 1 are provided with grooved wheels 7, loosely running on studs or screws. The rods $l\ l$ pass between these grooved wheels aforesaid. This lessens the friction of these parts, and the pulling-bar freely reciprocates thereon.

The central reversing-shaft, 3 3, as shown in Figs. 1 and 4, is made in two parts, but is held together by a central swivel-pin, 8. This enables one of the friction-pawls 2 2 to act independent of the other, which is, obviously, essential in rounding a curve, when one chain or band must travel faster than the other. The shaft is formed so both parts can be grasped by one hand and the pawls reversed at the will of the operator. The hollow shaft-heads have a plate or cover fastened on the outside, which covers up the friction mechanism and prevents the chains or bands from coming out. The clamping portion of the heads 1 1, as well as that of the pawls 2 2, may be faced with leather or rubber, if desirable.

9 9 are parallel bars, supported by the frame $a$, and having in them grooves, in which run the wheels on the sliding seat 10, in the usual manner.

11 11 are the spoon-brake levers, arranged one for each driving-wheel, and held out of contact therewith by light springs 12 12.

Attached to the brake-shaft, and under the sliding seat 10, is a lever, 13, extending out in front. Said lever is graduated and marked with the different weights of rowers, and has notches or holes in which to hang a weight or spring, as shown in Figs. 1 and 2. Now, if desired, by placing a rest under the back of the machine so the driving-wheels just clear the floor, and hanging a weight on the lever 13, so as to put on the brakes, the machine may be used as an ordinary exercising or rowing machine; and, furthermore, having first ascertained the amount of pull required to propel the machine on a level track by different weight-rowers, and the lever being graduated and marked with these weights aforesaid, it is only necessary to adjust the weight in the proper notch to correspond with the weight of the person rowing to give the same amount of friction to pull against, as would be the case if said person were propelling the machine over a track. Now, if the strokes or revolutions be registered, the distance, time, and speed of the rowers may be computed under similar conditions as if on a race course or track. The use of the machine in this manner, however, is secondary, as it is most especially designed as a rotary rowing machine, and the operation in using it is as follows: The operator seats himself on the sliding seat 10, and, having secured his feet properly in the foot-rest $q\ q$, grasps the pulling-handles $t\ t$, extending his arms and reaching forward as far as possible by drawing the seat forward and bending the knees. Assuming the friction-clutch pawls 2 2 to be in the position shown in dotted lines in Fig. 2, on commencing to draw the hands toward the body the pawls instantly wedge or clamp the endless chains or bands $n\ n$ against the seats on the heads or boxes 1 1, causing the chains to move with the pulling-bar, and thus, through the chain-wheels $c\ c$, cause the wheels $b\ b$ to revolve and propel the vehicle forward. The operator, continuing, draws the hands well up to the body, with the elbows thrown out, at the same time straightening the knees by pushing the feet against the foot-rests $q\ q$ and finishing the stroke with head erect, arms and shoulders well back, and chest thrown forward. On recovering, the operator should always let the hands pass the knees before drawing the body forward with the feet. It must be apparent that on recovering the pawls automatically release or disengage themselves and the chains or band freely slip by them. To stop the vehicle, press down the brake-levers 11 11. To reverse the revolution of the driving-wheels or back up, grasp the reversing-shaft 3 3 and throw the pawls 2 2 into the position shown in Fig. 5. The machine may now be backed by reciprocating the pulling-bar. This is obviously an advantage, especially when several machines abreast, occupying nearly the whole width of the track, start in a race and desire to back up for a new start or to get in line.

As shown in the drawings, I construct that part of the frame $a$ having the axles $d\ d'$ U-shaped, so as to bring the sliding seat and operator or rower below the center of the driving-wheels and near the ground, thus insuring the stability of the vehicle by having its center of gravity low down. This is very essential in a machine or vehicle adapted to turn short curves at a high rate of speed, propelled by such muscular exertion as rowing; and still another advantage in constructing the frame U-shaped is it admits of making the vehicle shorter and more compact, as the rower can slide back and forth below and between the centers of the driving-wheels. The front of the frame $a$ is curved upward to admit of using a proper size steering-wheel, and the sector $r$ also curved to make the connection between the foot-bar $p$ (which must be low down on a line with the seat) and the small gear $u$ on the spindle $f$ above the steering-wheel $e$.

It is obvious that I could connect the foot-bar and steering-wheel by other means—such as a cord or chain—but I prefer the present device as least liable to cause trouble by wearing out. It is also apparent that outriggers could be applied to this machine or vehicle and suitable levers pivoted thereon, and having friction-clutch devices for engaging the endless cords or chains; but I prefer my present construction, as I am thus enabled to make a very compact and narrow vehicle, which is of utmost importance when it is considered that these vehicles are most especially designed for racing purposes (several abreast) in public halls and rinks.

If preferred, the stirrup-shaped pulling-handles $t\ t$ may be dispensed with, and the operator grasp the reciprocating pulling-bar direct.

It will be of course understood that my invention, when applied to a boat or conveyance for traveling on water, will revolve one or more paddle or other propelling wheels and the steering-bar be connected to a rudder or other water-steering device, and when used for this purpose will prove very advantageous over sculls or oars, as more speed and less liability to fouling will result.

Now, what I claim as a novel and useful invention, and desire to secure by Letters Patent, is—

1. In a rotary rowing machine provided with a sliding seat and wheel-propelling chains or bands, a friction-clutch for intermittently engaging said chains or bands, and so arranged as to be readily reversed or entirely thrown out of engagement therewith, for the purpose set forth.

2. The herein-described rotary rowing machine or vehicle, consisting of the frame $a\ d\ d$, having sliding seat 10, wheels $b\ b\ e$, chain-wheels $c\ c\ k\ k$, cross-bar $j$, rods $l\ l$, and chains or bands $n\ n$, having frictionally associated therewith the reciprocating bar provided with pulling-handles $t\ t$, the foot-rest $p\ q\ q$, steering device $r\ u$, and brake 11, all arranged and operating substantially as specified.

3. In a rotary rowing machine or vehicle, the frame or axle made U-shaped to admit of the rower moving back and forth between and below the centers of the driving-wheels, for the purpose set forth.

4. The construction and arrangement of the steering device, consisting of the foot-bar $p$, sector-gear $r$, and small gear $u$, for working or giving motion to the steering wheel or wheels of a wheeled vehicle, as set forth.

5. In a hand-propelled wheeled vehicle, the endless chains, cords, or bands for transmitting the power, suitable supporting wheels or pulleys for them, and a reciprocating bar having automatic independently-acting friction-clutch devices for engaging said endless chains, cords, or bands, as set forth.

6. A hand-propelled wheeled vehicle having endless propelling chains, cords, or bands, and reversible friction-clutches for engaging said chains, cords, or bands in either direction, substantially as and for the purpose set forth.

7. In combination with a wheeled vehicle, endless chains, cords, or bands, suitable wheels or pulleys for them, cross-bar or wheel pivots $j$, screw-stud $i$, and check-nuts $o\ o$, substantially as and for the purpose set forth.

8. In a wheeled vehicle having endless chains, cords, or bands, a reciprocating pulling-bar having anti-friction wheels 7, in combination with rods or supports $l\ l$, as and for the purpose set forth.

9. In combination with a wheeled vehicle, a brake-lever graduated or marked with the different weights of operators, substantially as and for the purpose set forth.

10. In a wheeled vehicle, the U-shaped frame or axle, combined with a reciprocating seat, substantially as and for the purpose set forth.

11. In a wheeled vehicle having a reciprocating seat, the combination of the wheel-propelling chains, cords, or bands with the stirrup-shaped pulling-handles $t\ t$, as and for the purpose set forth.

In testimony whereof I have affixed my signature in presence of two witnesses.

DANIEL E. KEMPSTER.

Witnesses:
HENRY CHADBOURN,
JOHN H. FOSTER.